(12) United States Patent
Licence et al.

(10) Patent No.: US 10,044,690 B2
(45) Date of Patent: Aug. 7, 2018

(54) SECURE MEDIA CAPTURE, TRANSFER, AND STORAGE

(71) Applicant: EYEWITNESS TO ATROCITIES, London (GB)

(72) Inventors: Tim Licence, Hampshire (GB); Tim Hughes, London (GB); John Shrives, Stansted (GB); Nigel Charles Richards, Salisbury (GB); Mark Ellis, London (GB); David Eric Ilsley, Hampshire (GB); John Timothy Buswell, Hants (GB); Gary John Kendall, Eastleigh (GB); Wendy Betts, London (GB)

(73) Assignee: EYEWITNESS TO ATROCITIES, London (GB)

( * ) Notice: Subject to any disclaimer, the term of this patent is extended or adjusted under 35 U.S.C. 154(b) by 101 days.

(21) Appl. No.: 15/175,502

(22) Filed: Jun. 7, 2016

(65) Prior Publication Data

US 2016/0360257 A1 Dec. 8, 2016

Related U.S. Application Data

(60) Provisional application No. 62/172,382, filed on Jun. 8, 2015.

(51) Int. Cl.
| | | |
|---|---|---|
| *H04N 7/167* | (2011.01) | |
| *H04L 29/06* | (2006.01) | |
| *H04L 29/08* | (2006.01) | |
| *H04W 4/02* | (2018.01) | |
| *H04N 21/4408* | (2011.01) | |
| *H04N 21/254* | (2011.01) | |
| *H04N 21/414* | (2011.01) | |
| *H04N 21/4223* | (2011.01) | |
| *H04N 21/658* | (2011.01) | |
| *H04N 21/81* | (2011.01) | |

(52) U.S. Cl.
CPC .......... *H04L 63/0435* (2013.01); *H04L 67/06* (2013.01); *H04L 67/42* (2013.01); *H04N 21/2541* (2013.01); *H04N 21/41407* (2013.01); *H04N 21/4223* (2013.01); *H04N 21/4408* (2013.01); *H04N 21/6582* (2013.01); *H04N 21/8133* (2013.01); *H04W 4/02* (2013.01)

(58) Field of Classification Search
CPC .......... H04N 21/4408; H04N 21/2541; H04N 21/41407; H04N 21/4223; H04N 21/6582; H04N 21/8133; H04L 63/0435; H04L 67/42; H04L 67/06; H04W 4/02
See application file for complete search history.

(56) References Cited

U.S. PATENT DOCUMENTS

2015/0169898 A1\* 6/2015 Lembcke ............ G06F 21/6245
726/28
2017/0180961 A1\* 6/2017 Gauglitz ............... H04W 4/206

\* cited by examiner

*Primary Examiner* — Oschta Montoya
(74) *Attorney, Agent, or Firm* — DLA Piper LLP US

(57) ABSTRACT

A secure media capture device may comprise a secure memory, a first sensor, a second sensor, a processor, and a communication module. The first sensor may be configured to capture media. The second sensor may be configured to capture data indicating a time, a place, or a combination thereof at which the media is captured. The processor may be configured to obtain device metadata; associate the data, the media, and the device metadata to form a submission; encrypt the submission; and store the submission in the secure memory The communication module may be configured send to the submission to a public web server via a public network.

33 Claims, 11 Drawing Sheets

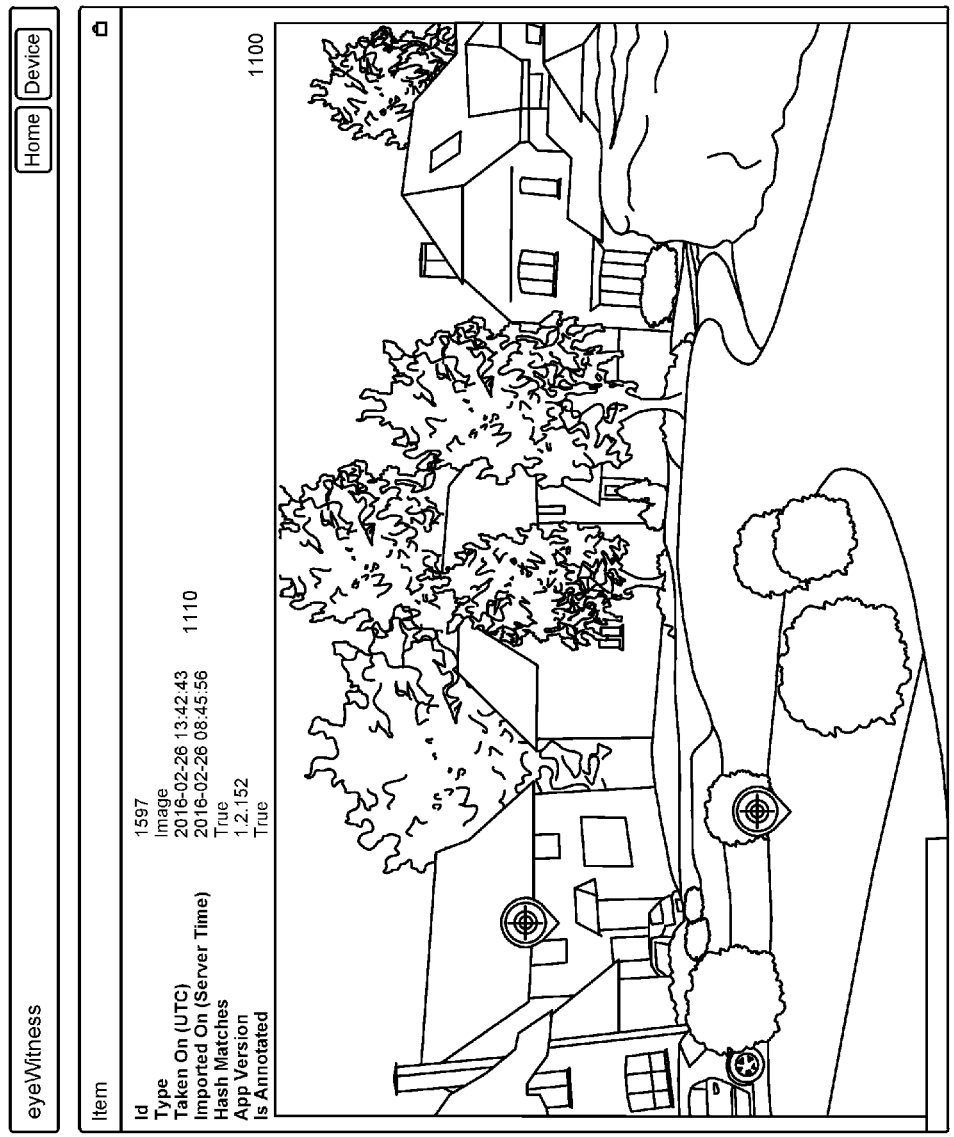

US 10,044,690 B2

SECURE MEDIA CAPTURE, TRANSFER, AND STORAGE

CROSS REFERENCE TO RELATED APPLICATIONS

This application claims the benefit of U.S. Provisional Application No. 62/172,382, filed Jun. 8, 2015 entitled "SECURE MEDIA CAPTURE, TRANSFER, AND STORAGE" which is hereby incorporated by reference in its entirety.

BRIEF DESCRIPTIONS OF THE DRAWINGS

FIGS. 9-11 are client screenshots according to an embodiment of the invention.

DETAILED DESCRIPTION OF SEVERAL EMBODIMENTS

Figure 1:
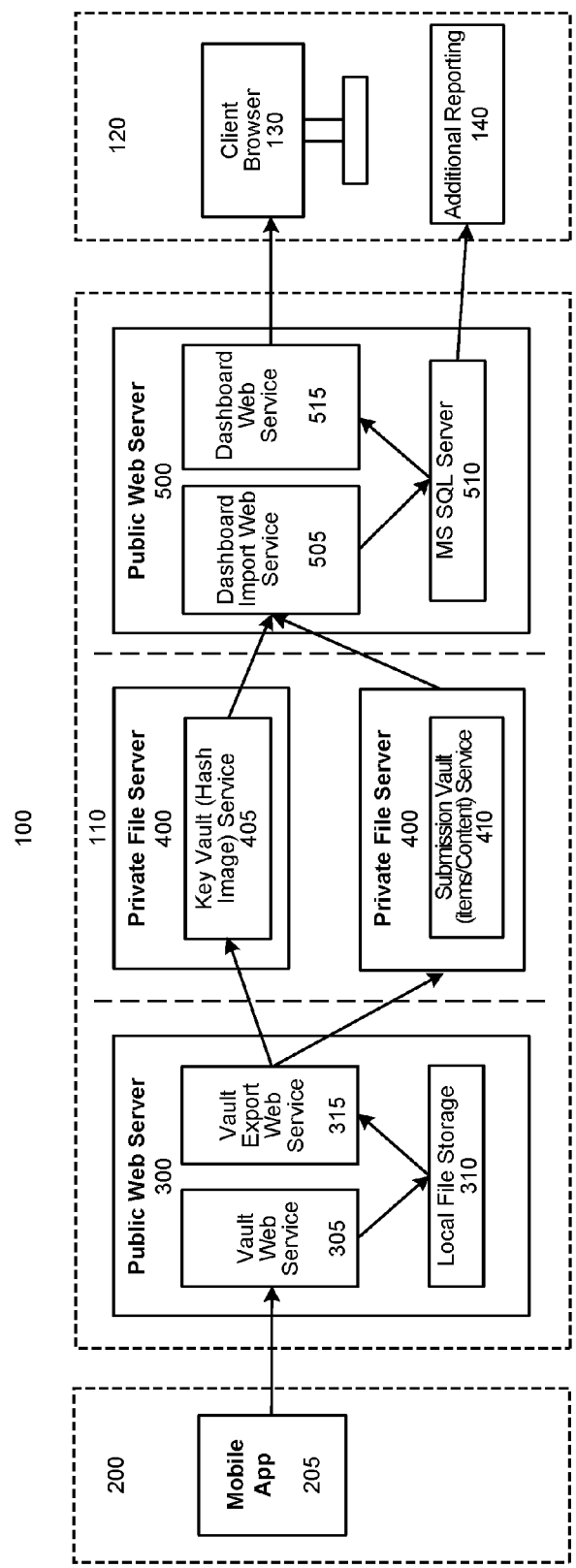
FIG. 1 is a network according to an embodiment of the invention.

Systems and methods described herein may capture, transmit, and store data so that the data can meet legal standards of evidence. A device such as a smartphone may include one or more sensors such as cameras, microphones, accelerometers, gyroscopes, etc. Data such as images, videos, sounds, etc. may be captured by a sensor. In many situations, data captured by a device may be useful as evidence in court proceedings. For example, war crimes and other atrocities may often come to light when a witness anonymously and/or surreptitiously films or photographs the event and distributes the captured data publicly. This data may be important evidence for a trial. However, in order to use the data as evidence in a trial, courts may require more than the captured sensor data. For example, courts may require proof that the captured data was recorded when and where it is purported to have been recorded. Courts may also require proof that the captured data has not been altered. The systems and methods described herein may produce evidence meeting these and/or other admissibility standards.

Systems and methods providing these and other features may comprise one or more computers, which may also be referred to as processors. A computer may be any programmable machine or machines capable of performing arithmetic and/or logical operations. In some embodiments, computers may comprise processors, memories, data storage devices, and/or other commonly known or novel components. These components may be connected physically or through network or wireless links. Computers may also comprise software that may direct the operations of the aforementioned components. Computers may be referred to with terms that are commonly used by those of ordinary skill in the relevant arts, such as servers, PCs, mobile devices, routers, switches, data centers, distributed computers, and other terms. Computers may facilitate communications between users and/or other computers, may provide databases, may perform analysis and/or transformation of data, and/or perform other functions. In some embodiments, the computers used in the described systems and methods may be special purpose computers configured specifically to produce evidence. For example, a device may be equipped with specialized sensors, processors, memory, communication components, etc. that are configured to work together to capture any and all data necessary to meet evidentiary standards and to securely transmit and/or store the captured data.

Computers may be linked to one another via a network or networks. A network may be any plurality of completely or partially interconnected computers wherein some or all of the computers are able to communicate with one another. It will be understood by those of ordinary skill that connections between computers may be wired in some cases (e.g., via Ethernet, coaxial, optical, or other wired connection) or may be wireless (e.g., via Wi-Fi, WiMAX, or other wireless connection). Connections between computers may use any protocols, including connection-oriented protocols such as TCP or connectionless protocols such as UDP. Any connection through which at least two computers may exchange data can be the basis of a network. In some embodiments, specialized networks and/or communication techniques may be employed by the described systems and methods to preserve the evidentiary validity of any transmitted data.

FIG. 1 is a network 100 according to an embodiment of the invention. The network 100 may include a public network such as the Internet or a local network and/or a secure private network. One or more devices 200 (e.g., smartphones, tablets, laptop computers, security systems, cameras, etc.) may communicate with a backend system 110 via the network 100. Device 200 may include an app 205 and/or other components described in greater detail below. The backend system 110 may also communicate with one or more clients 120 (e.g., computers including browsers 130, other communications hardware/software 140, and/or other components) via the network 100. In some embodiments the backend system 110 may include a public web server 300 which may communicate with device 200, a private file server 400 which may receive and store data from the public web server 300, and a private web server 500 which may retrieve data from the private file server 400 and communicate with client 120. Public web server 300 may include a vault web service 305, local file storage 310, vault export web service 315, and/or other components. Private file server 400 may include a key vault service 405, submission vault service 410, and/or other components. Private web server 500 may include a dashboard import web service 505, data management (e.g., structured query language (SQL)) server 510, dashboard web service 515, and/or other components. The servers 300, 400, 500 and their components are described in greater detail below. Together, the network 100 elements such as devices 200, servers 300, 400, 500, and clients 120 may gather, store, and report evidence for use in trials, investigations, or other proceedings. The evidence may have verifiable veracity and integrity, for example provided by the processes described in greater detail below.

Figure 2:
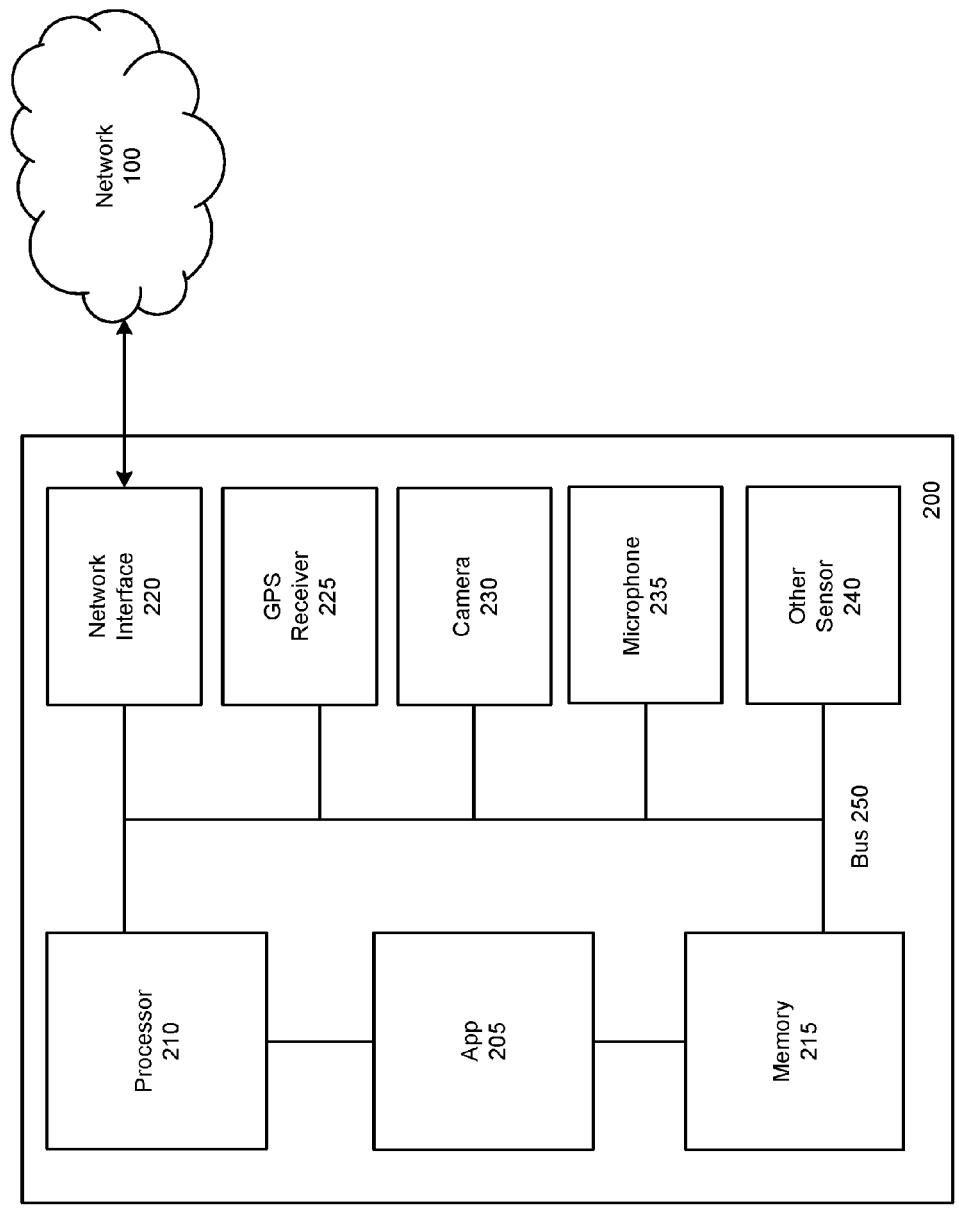
FIG. 2 is a device according to an embodiment of the invention.

FIG. 2 is a device 200 according to an embodiment of the invention. The device 200 may comprise elements such as a processor 210, memory 215, network interface 220 (e.g., cellular, WiFi, Bluetooth, and/or other communication types), and/or one or more sensors (e.g., GPS or other geolocation data (e.g., GLONASS, Galileo, etc.)) receiver 225, camera 230, microphone 235, other sensor(s) 240) connected to one another via a bus 250. The device 200 may include an app 205, which may be implemented via the memory 215 and processor 210 in some embodiments. As discussed in greater detail below, the app 205 may perform processing associated with device 200 setup, receiving and annotating sensor data, and/or transmitting the annotated data via the network interface 220. In essence, the app 205 may cause the device 200 to function as a sensor data gathering and encrypted verifiable submission system. The device 200 is shown herein as a single computer with one of each component for ease of illustration, although the device 200 may also comprise a plurality of computers and/or a plurality of individual components (e.g., processors 210, memories 215, sensors 225-240, etc.). Example devices 200 may include smartphones, tablets, PCs, security cameras, digital cameras, etc.

Figure 3:
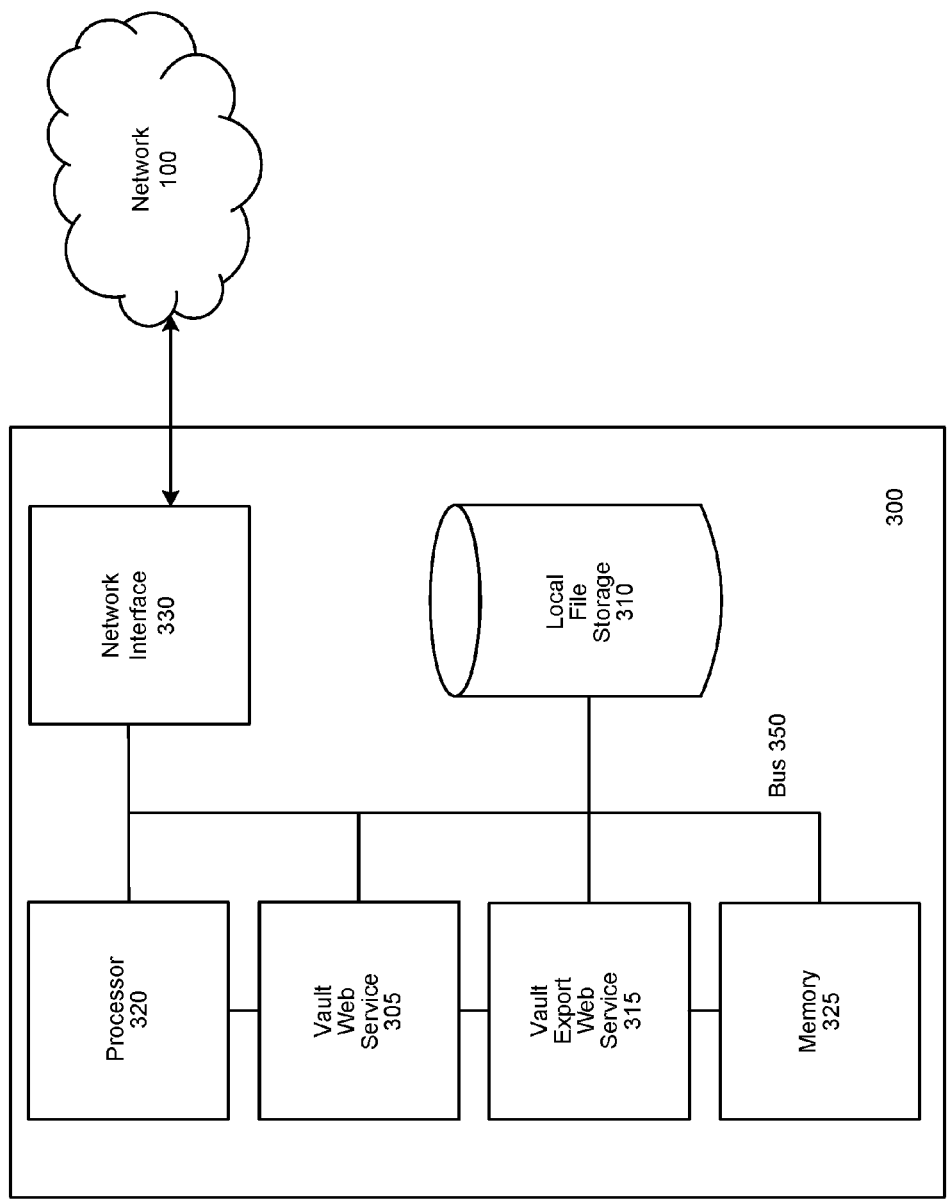
FIG. 3 is a public web server according to an embodiment of the invention.

FIG. 3 is a public web server 300 according to an embodiment of the invention. The public web server 300 may be a special purpose computer configured to register devices 200, receive and process data from the devices 200, and send data to the private file server 400. The public web server 300 may comprise elements such as a processor 320, memory 325, network interface 330 (e.g., wired or wireless Ethernet connection and/or other communication types), and/or local file storage 310 (e.g., a database) connected to one another via a bus 350. The public web server 300 may include a vault web service 305 and vault export web service 315, which may be implemented via the memory 325 and processor 320 in some embodiments. As discussed in greater detail below, the vault web service 305 may perform processing associated with device 200 interaction (e.g., device 200 registration and receiving data from the device 200 via the network 100), and the vault export web service 315 may perform processing associated with private file server 400 interaction (e.g., exporting data to the private file server 400). The public web server 300 is shown herein as a single computer with one of each component for ease of illustration, although the public web server 300 may also comprise a plurality of computers and/or a plurality of individual components (e.g., processors 320, memories 325, local file stores 310, network interfaces 330 etc.).

Figure 4:
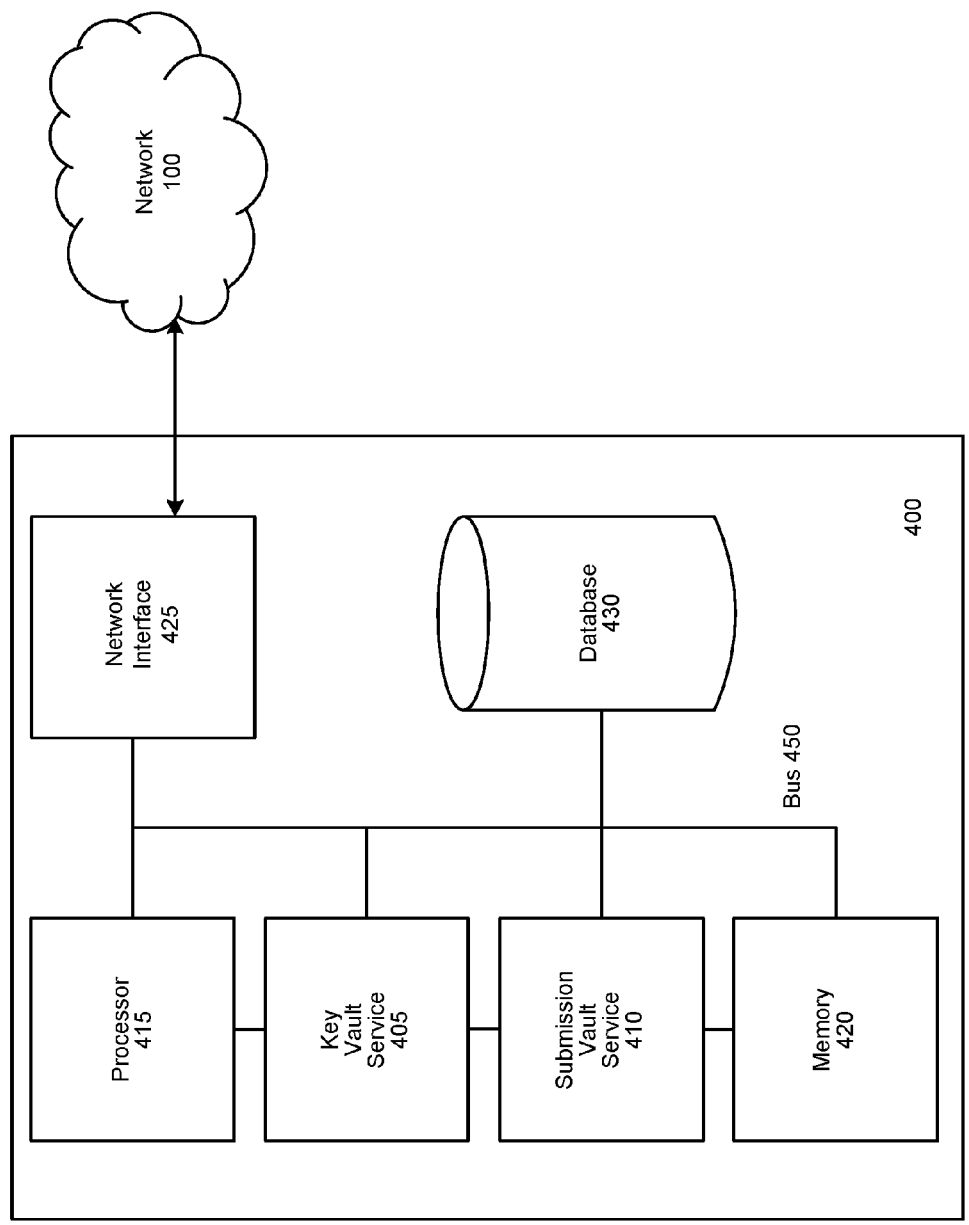
FIG. 4 is a private file server according to an embodiment of the invention.

FIG. 4 is a private file server 400 according to an embodiment of the invention. The private file server 400 may be a special purpose computer configured to receive data from the public web server 300, secure and store the data, and provide the data the a private web server 500. The private file server 400 may comprise elements such as a processor 415, memory 420, network interface 425 (e.g., wired or wireless Ethernet connection and/or other communication types), and/or database 430 connected to one another via a bus 450. The private file server 400 may include a key vault service 405 and submission vault service 410, which may be implemented via the memory 420 and processor 415 in some embodiments. As discussed in greater detail below, the key vault service 405 may perform processing associated with data security, and the submission vault service 410 may perform processing associated with data storage. The private file server 400 is shown herein as a single computer with one of each component for ease of illustration, although the private file server 400 may also comprise a plurality of computers and/or a plurality of individual components (e.g., processors 415, memories 420, databases 430, network interfaces 425, etc.).

Figure 5:
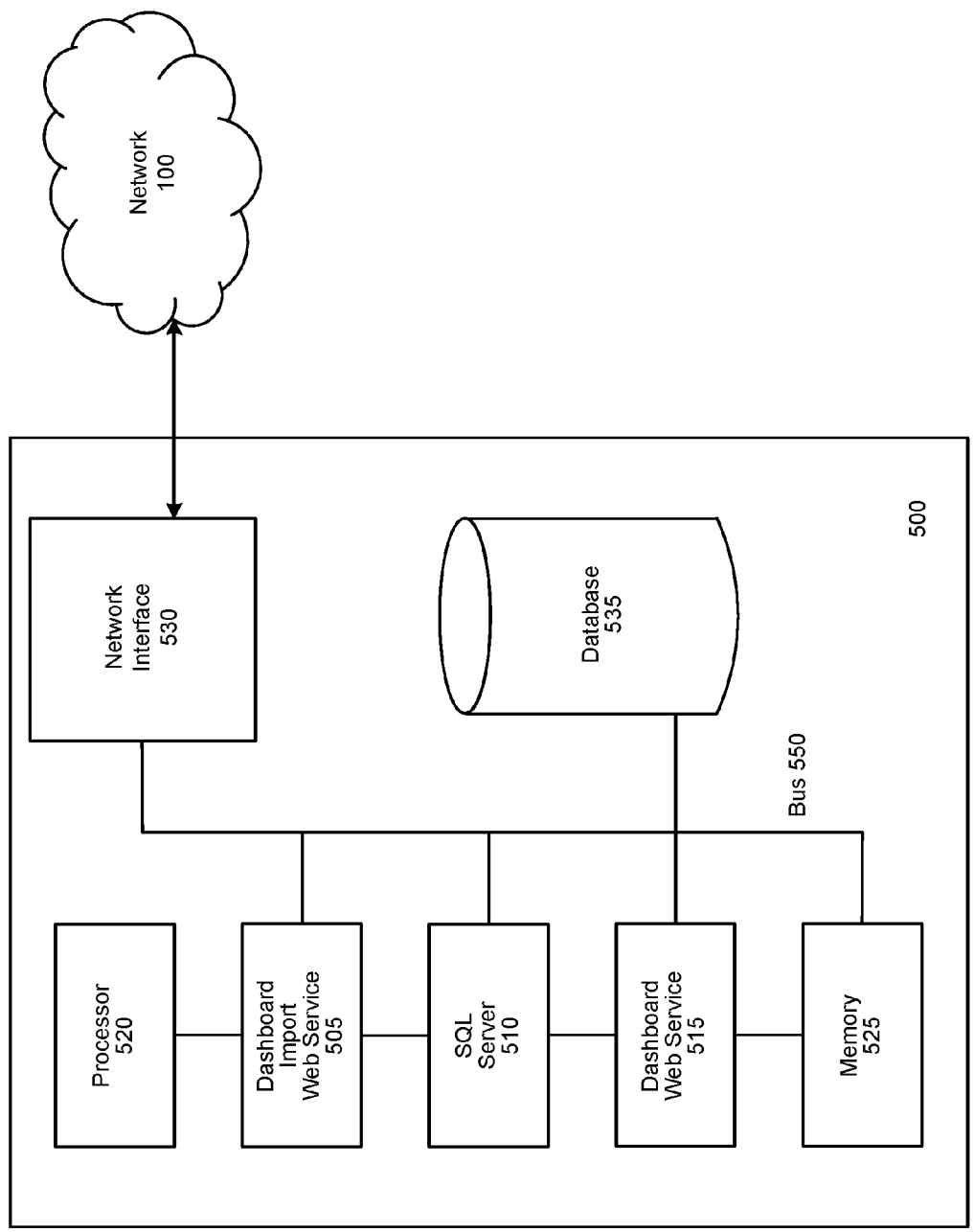
FIG. 5 is a private web server according to an embodiment of the invention.

FIG. 5 is a private web server 500 according to an embodiment of the invention. The private web server 500 may be a special purpose computer configured to retrieve data from the private file server 400 and securely distribute and/or report it to clients 120. The private web server 500 may comprise elements such as a processor 520, memory 525, network interface 530 (e.g., wired or wireless Ethernet connection and/or other communication types), and/or database 535 connected to one another via a bus 550. The private web server 500 may include a dashboard import web service 505, SQL server 510, and dashboard web service 515, which may be implemented via the memory 525 and processor 520 in some embodiments. As discussed in greater detail below, the dashboard import web service 505 may perform processing associated with private file server 400 interaction, and the SQL server 510 and dashboard web service 515 may perform processing associated with client 120 interaction. The private web server 500 is shown herein as a single computer with one of each component for ease of illustration, although the private web server 500 may also comprise a plurality of computers and/or a plurality of individual components (e.g., processors 520, memories 525, databases 535, network interfaces 530, etc.).

Figure 6:
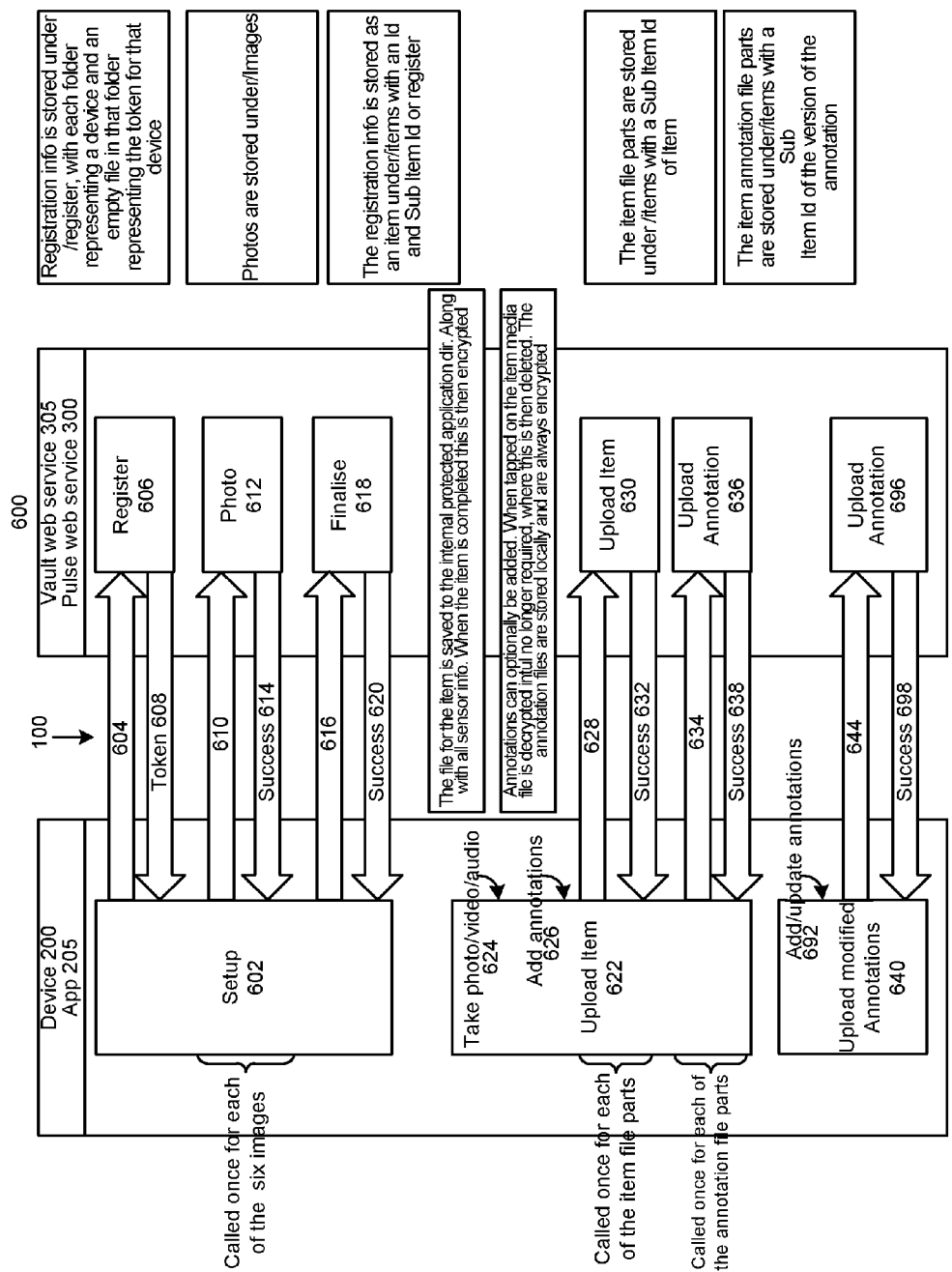
FIG. 6 is a secure media capture and transfer process according to an embodiment of the invention.
Figure 7:
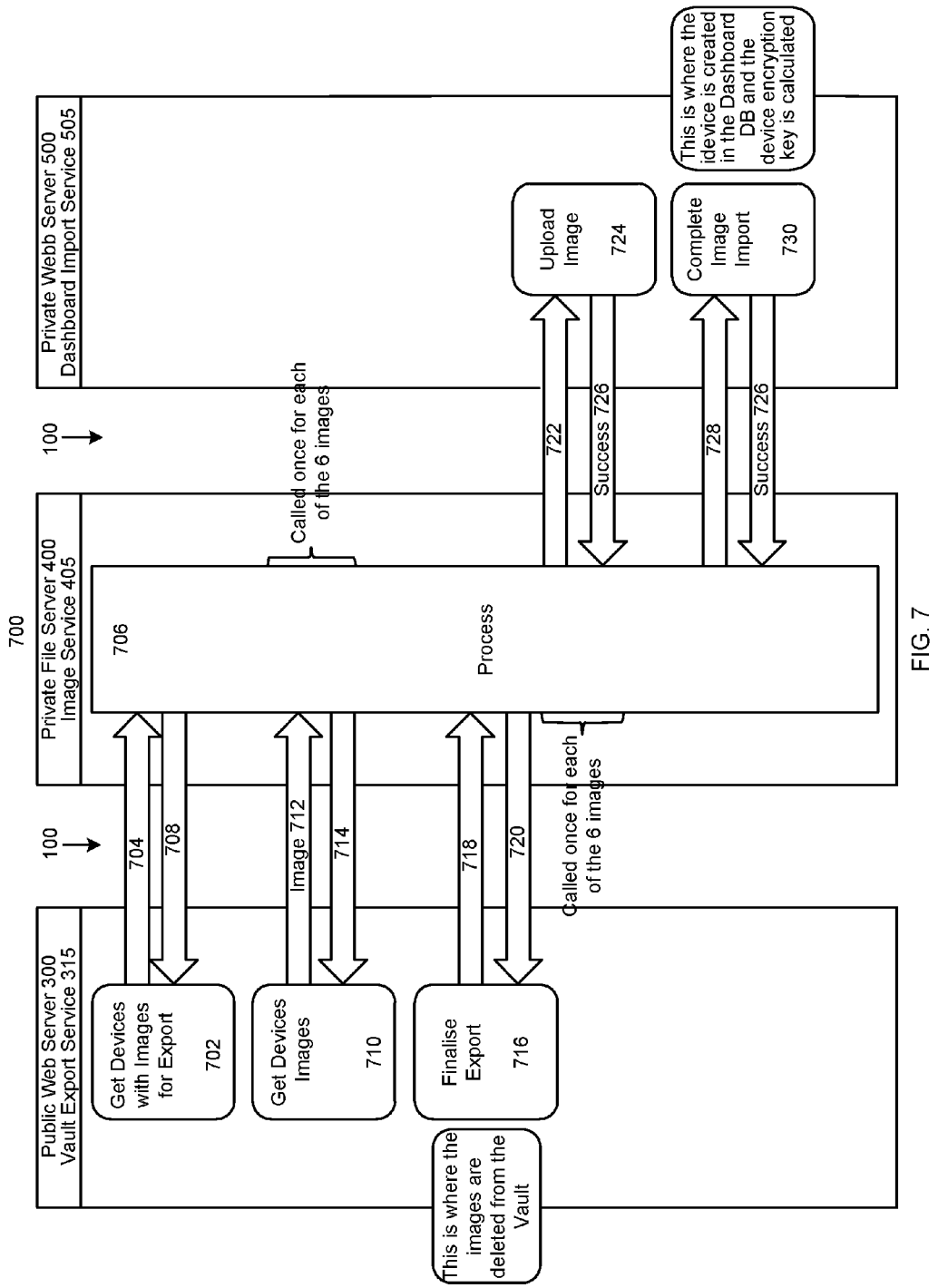
FIG. 7 is a secure data transfer process according to an embodiment of the invention.
Figure 8:
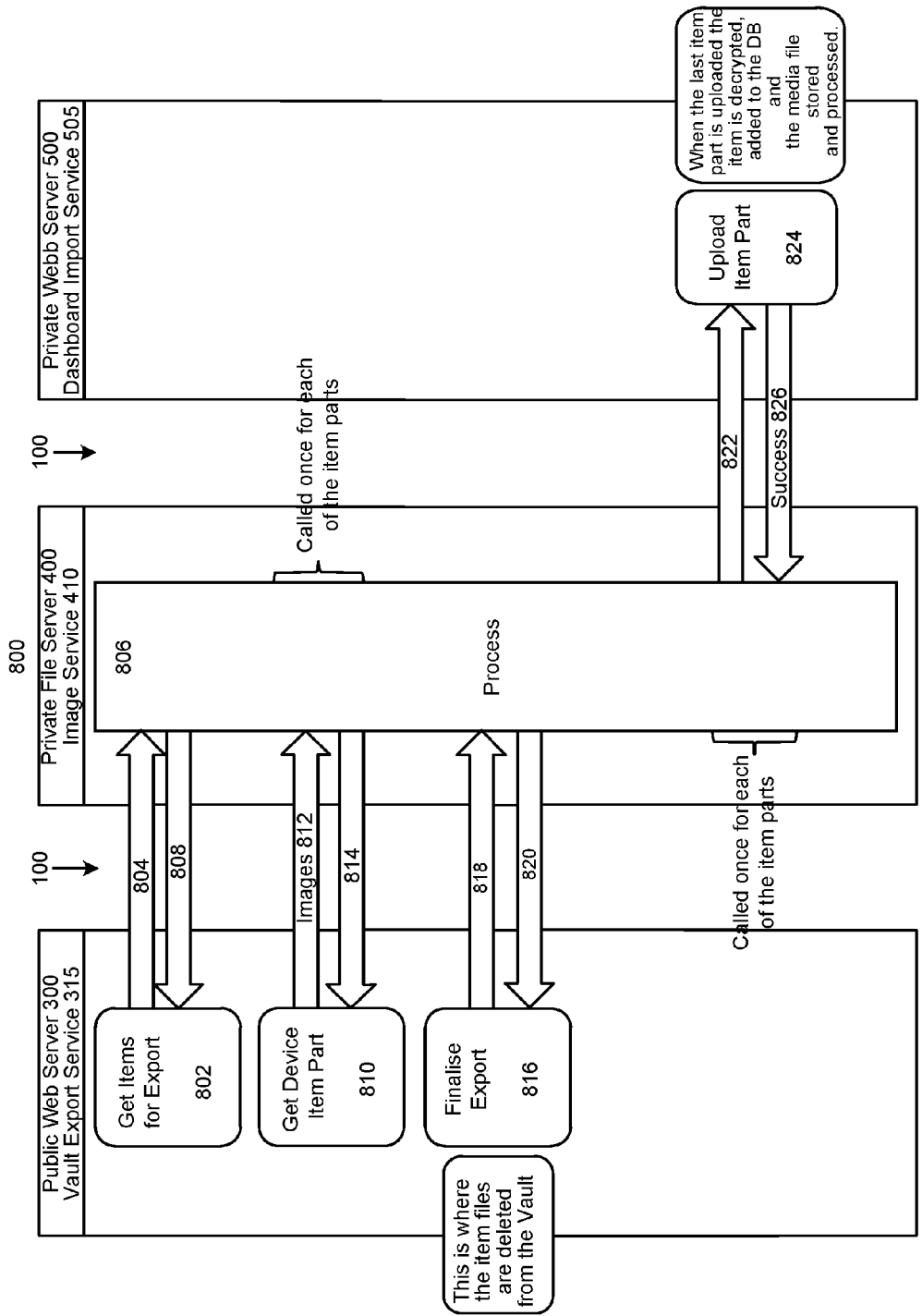
FIG. 8 is a secure media transfer process according to an embodiment of the invention.

FIGS. 6-8 illustrate processes enabling media capture, storage and distribution such that the captured media can be used in a potential prosecution in a court of law. FIG. 6 illustrates a high level process wherein a device 200 is registered with the system and sends data, emphasizing interactions between device 200 and public web server 300. FIGS. 7 and 8 illustrate more detailed views of the process (e.g., registration in FIG. 7 and data submission and processing in FIG. 8), emphasizing interactions between public web server 300, private file server 400, and private web server 500.

FIG. 6 is a secure media capture and transfer process 600 according to an embodiment of the invention. The device 200 may be connected to the network 100 and set up. For example, if the device 200 is a consumer device such as a smartphone or tablet, the app 205 may be installed on the device 200 and run for a first time. On the first use of the app 205, a setup process 602 may be initiated. This may include gathering data about the device and/or user information, which may be entered by the user. The data may be sent 604 to the vault web service 305 of the public web server 300 via the network 100. The vault web service 305 may receive this data and register 606 the device 200. Registration may include establishing a public-private encrypted key that may be used for all future communications from the device 200 to the public web server 300. Registration information and a device token may be stored for each device 200 in local file storage 310 and/or another database. The device token may be sent 608 to the device 200 via the network 100. In some embodiments, the device 200 may capture a photo or other media and send 610 it to the public web server 300 via the network 100. The app 205 may prompt a user to take and upload one or more photos (e.g., 6 photos) using the app 205, and the photos may be used by the public web server 300 to establish the public-private encryption key used to secure communications between the device 200 and public web server 300. In some embodiments the app 205 may present a forced tutorial to the user, wherein the user takes and/or annotates at least one photo, enters the app 205 gallery, and uploads the photo before the app can be used further. The vault web service 305 may store 612 the received data in the local file storage 310 and report successful receipt and storage 614 to the app 205 via the network 100. The app 205 may send an acknowledgement 616 to the vault web service 305 via the network. The vault web service 305 may finalize generation of the key 618 and transmit the key 620 to the app 205 via the network 100. The key may be used in subsequent transfers.

After the device 200 is registered, the app 205 may present an interface allowing a user to capture media. Additionally, after the device 200 is registered, any future instances of running the app 205 may proceed directly to this interface without requiring registration. Media may be captured 624 (e.g., by a user taking a photo, recording video, and/or recording audio). The captured media and sensor data may be saved in a secure location within internal memory 215. Sensor data may be used to provide context for the captured media. For example, the sensor data may confirm the orientation and movement of the device 200, device location 200, and date/time of media capture, using relevant satellite sensors, neighboring cell tower identification, and/or WIFI access points. Sensor data acquired before, during, and after capture may be stored to help verify and authenticate the captured video, photo, or audio recording. Video and photos may have a pixel count taken at the point of capture. The pixel count may be hashed, and the hash may be added to the sensor data directly at the point of capture and confirmed at the point of receipt to verify the submission has not been altered or changed in any way, for example. The sensor data, pixel hash, and recorded media (video, photo, audio) may be referred to as the "submission." The submission may be encrypted and packed together in one file.

The following are examples of sensor data that may be captured:
Common
State:
    0=Not available
    2=Disabled
    3=Searching
    4=Populated
Accelerometer
accelerometerInfo:
    axisX
    axisY
    axisZ
Bluetooth
bluetoothInfo
    bluetoothDeviceList: List of devices found:
    deviceMacAddress: Bluetooth MAC address
    deviceName: Bluetooth name
WIFI
wifiInfo
    wifiDeviceList: List of devices found:
    BSSID: WIFI MAC address
    SSID: WIFI network name
    Capabilities: Describes the authentication, key management, and encryption schemes supported by the access point
    Frequency: The frequency in MHz of the WIFI channel
    Timestamp: Time Synchronization Function (tsf) timestamp (e.g., in microseconds)
    Level: The detected signal level (e.g., in dBm)
Device
deviceInfo
    Name: The user's name (set at registration)
    Email: The user's email (set at registration)
    DeviceModel: The model name of the device
    DeviceName: The name of the industrial design.
    DeviceProduct: The name of the overall product.
    DeviceVersion: The OS version installed on the device
    DeviceDateTime: The device time in MS
    DeviceApiLevel: The Android API level of the installed OS
GEOLOCATION
geolocationInfo
    Accuracy: Estimated accuracy of the latitude/longitude fix (e.g., in meters). For example, if a circle is drawn with latitude/longitude as the center and the accuracy as the radius, then there may be a 68%, or one standard deviation, chance that the user is inside this circle.
    Altitude: Altitude if available (e.g., in meters above sea level)
    Bearing: Horizontal travel of this device (e.g., in degrees)
    geolocationDateTime: The time of the geolocationfix (e.g., in MS)
    Latitude: Latitude (e.g., in degrees)
    Longitude: Longitude (e.g., in degrees)
Gyroscope
gyroscopeInfo
    axisX
    axisY
    axisZ
Mobile
mobileInfo
    cellLocation: Info on the connected cell:
    Common:
    mobileType: The type of cell
    0=GSM
    1=CDMA
    2=LTE
    3=WCDMA
    cellId: The cell Identifier
    GSM:
    Lac: Location area code
    Psc: Primary scrambling code
    Mcc: Mobile country code (e.g., in Android 4.2+ devices)
    Mnc: Mobile network code (e.g., in Android 4.2+ devices)
    CDMA:
    baseStationLatitude: Latitude of base station (e.g., in units of 0.25 seconds), if known
    baseStationLongitude: Longitude of base station (e.g., in units of 0.25 seconds), if known
    networkId: Network Id
    systemId: >System Id
    LTE:
    mcc: Mobile country code
    mnc: Mobile network code
    pci: Physical cell Id
    tac: Tracking area code
    WCDMA:
    lac: Location area code
    psc: Primary scrambling code
    mcc: Mobile country code (e.g., in Android 4.2+ devices)
    tune: Mobile network code (e.g., in Android 4.2+ devices)
mobileInfoCellList: A list of cells that the phone can see Submissions may be uploaded in parts to the public web server 300. For example, the app 205 may split files into 0.5 megabyte files (or some other convenient file size) and send them separately. The first file may be tagged 1 of x (where x is the total number of files), the second file may be tagged 2 of x, and so on. The files may be sent separately with these pointers and reassembled. If there is a problem with connectivity or the upload process is otherwise interrupted, the upload may pick up where it left off when connection is reestablished. If all the parts are not uploaded for any reason, the file may never move past the public web server 300 to the private file server 400. Submissions may be reconstructed and checked until the submission is completed. Using an automated process, the submission may be checked for validity via the initial public/private key set up. The original submission, though moved and uploaded in parts, has never been decrypted nor changed in any way.

The submission may be annotated 626. For example, a device 200 user may be able to add notes or other information about the captured media. Annotation files may be stored locally in device 200, memory 215.

Data (e.g., submissions and annotations) may be uploaded 622 to the public web server 300. This may happen periodically and/or may be triggered by the device 200 user. Each submission may be uploaded. The submission may be sent 628 to the server 300. The server 300 may store the submission 630 in local file storage 310 and confirm successful upload 632 in a message to the device 200 Similarly, each annotation may be uploaded. The annotation may be sent 634 to the server 300. The server 300 may store the annotation 636 in local file storage 310 and confirm successful upload 638 in a message to the device 200. For example, submissions and associated annotations may be stored in the same folder in the local file storage 310 or otherwise associated with one another.

Annotations may also be added and/or changed after submissions are uploaded 640. For example, a user may add and/or change annotations on the device 200, and the device 200 may upload the changes 644 to the public web server 300. The public web server 300 may add the updated annotations 646 to the local file storage 310 and confirm successful upload 648 in a message to the device 200.

To provide the basic functionality described above and/or other features, the app 205 may provide a user interface (UI) incorporating features to promote the safety of the user. These features may include, but are not limited to, the following.

The user may select his/her own icon from a menu (e.g., in an example embodiment, 40 camera related options for icons may be provided). The app 205 may store all media in a secure storage area accessible within the app 205, not the standard device 200 gallery accessible via other programs and/or the general device 200 UI. A user-defined passcode (e.g., a passcode swipe) may be input into the app 205 to provide access to the secure storage area. The user may be able to immediately exit the secure storage area by clicking an icon, for example. The user may be able to easily delete the app 205 and its contents from device 200 memory. The app 205 may include an unsecured mode and a secured mode, wherein the unsecured mode may function like an ordinary camera application that stores media in the device 200 gallery, and the secured mode may store the media in the secure storage area. The app 205 may default to unsecured mode upon launch, and may be placed into secured mode through user input. Indication of the existence of the secured mode may not be shown in the unsecured mode.

FIG. 7 is a secure data transfer process 700 according to an embodiment of the invention which, for example, may be performed during registration of a device 200. The public web server 300 may periodically (or on demand) identify images for upload 702 to the private file server 400 and advise 704 the key vault service 405 of the private file server 400 that images are available from the public web server 300 (e.g., the six images captured in the app 205 as part of the registration process as described above). The key vault service 405 of the private file server 400 may receive the message 706 and acknowledge receipt 708. The public web server 300 may retrieve the images 710 from local file storage 310 and send them 712 to the private file server 400. The private file server 400 may confirm receipt of images 714. Upon receiving this confirmation, the public web server 300 may delete the images 716 and confirm deletion 718. The private file server 400 may acknowledge deletion 720.

The private file server 400 may send each image 722 to the private web server 500. The dashboard import web service 505 may receive the images 724, store them in the database 535, and report success 726 to the private file server 400. The private file server 400 may indicate that all images have been sent 728. When all images are sent, the private web server 500 may generate the key 730 for use with future submissions by the device 200 and confirm key generation 732.

FIG. 8 is a secure media transfer process 800 according to an embodiment of the invention that may be performed, for example, after a device 200 has been registered and is now submitting media for use as potential evidence. The public web server 300 may periodically (or on demand) identify images for upload 802 to the private file server 400 and advise 804 the media vault service 410 of the private file server 400 that images are available from the public web server 300 The media vault service 410 of the private file server 400 may receive the message 806 and acknowledge receipt 808. The public web server 300 may retrieve the images 810 from local file storage 310 and send them 812 to the private file server 400. The private file server 400 may confirm receipt of images 814. Upon receiving this confirmation, the public web server 300 may delete the images 816 and confirm deletion 818. The private file server 400 may acknowledge deletion 820.

The private file server 400 may send each item 822 to the private web server 500. The original, encrypted version may be stored in offline vault 410. A copy of the original may be transferred to the dashboard 505/database 535. This version may be decrypted, and the hash may be computed, checked, and confirmed from the raw bytes of the file. The dashboard import web service 505 may receive the items 824. For each item, after all item parts are received, the private web server 500 may decrypt the item, add it to the database 535, and store and process the associated media file. Then the private web server 500 may report success 826 to the private file server 400. In some embodiments, metadata may be stored in a table or other data structure and media files may be stored separately as files of an appropriate type (e.g., mpeg, jpeg, etc.). The metadata and media may be stored on the same server in some cases. The metadata and media may be associated to one another (e.g., the metadata may be linked to a directory path where the media is stored).

The sensor data file and the video, photo, or audio from the submission may be extracted for further analysis (e.g., sent to a client browser 130 and/or additional reporting mechanism 140). Thus, analysis may be performed on media that is known to be unaltered and is verifiable based on the additional sensor data. Meanwhile, the original unaltered data may remain in secure storage for future analysis or other uses.

Note that while the processes 700 and 800 of FIGS. 7 and 8 are initiated by the public web server 300 notifying the private file server 400 that images are available, in some embodiments the process may be initiated by the private file server 400 requesting images (either registration images, media images, or both) from the public web server 300. After the public web server 300 receives such a request, file transfers may proceed in similar fashion to the transfers of FIGS. 7 and 8.

Figure 9:
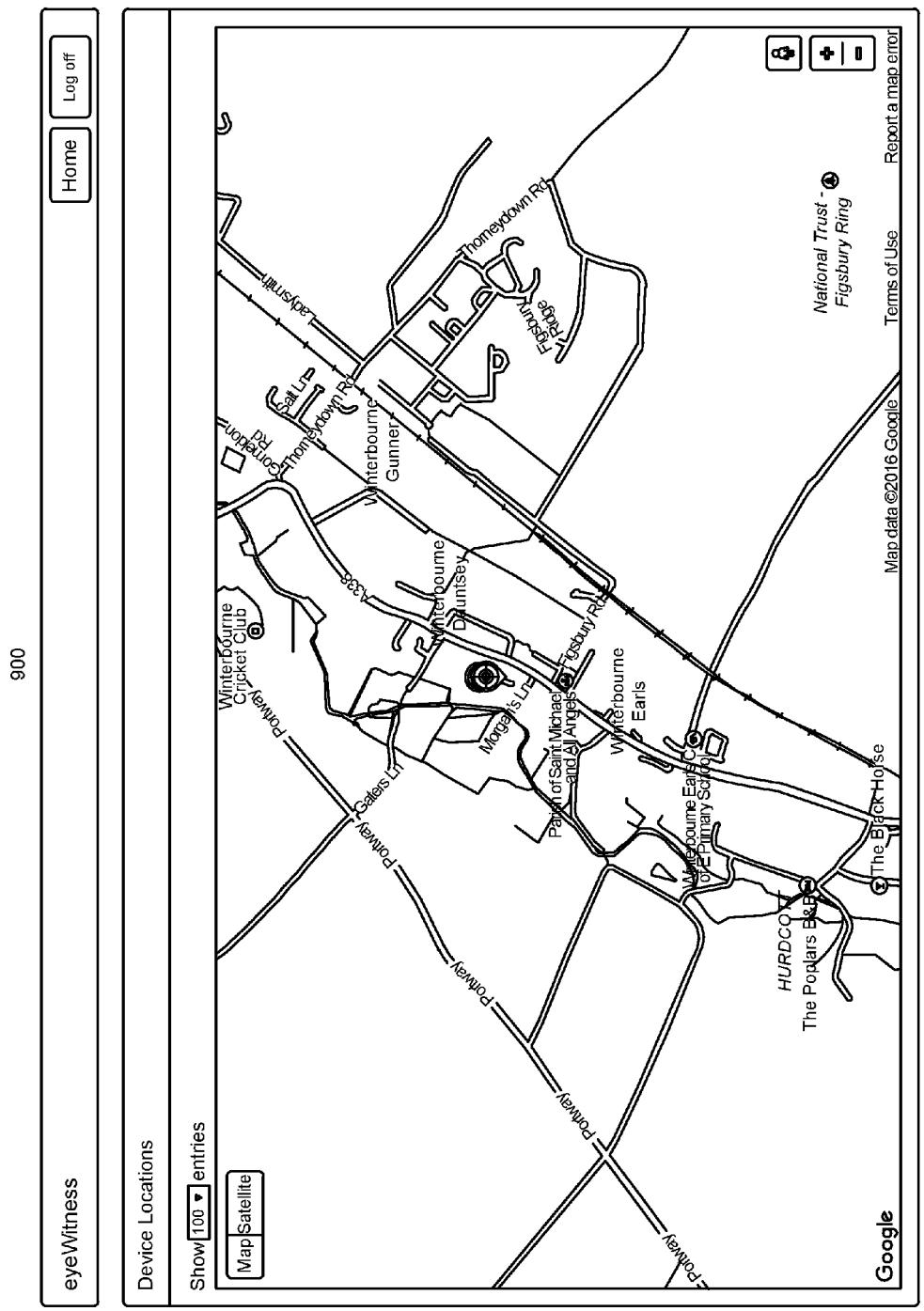
Figure 10:
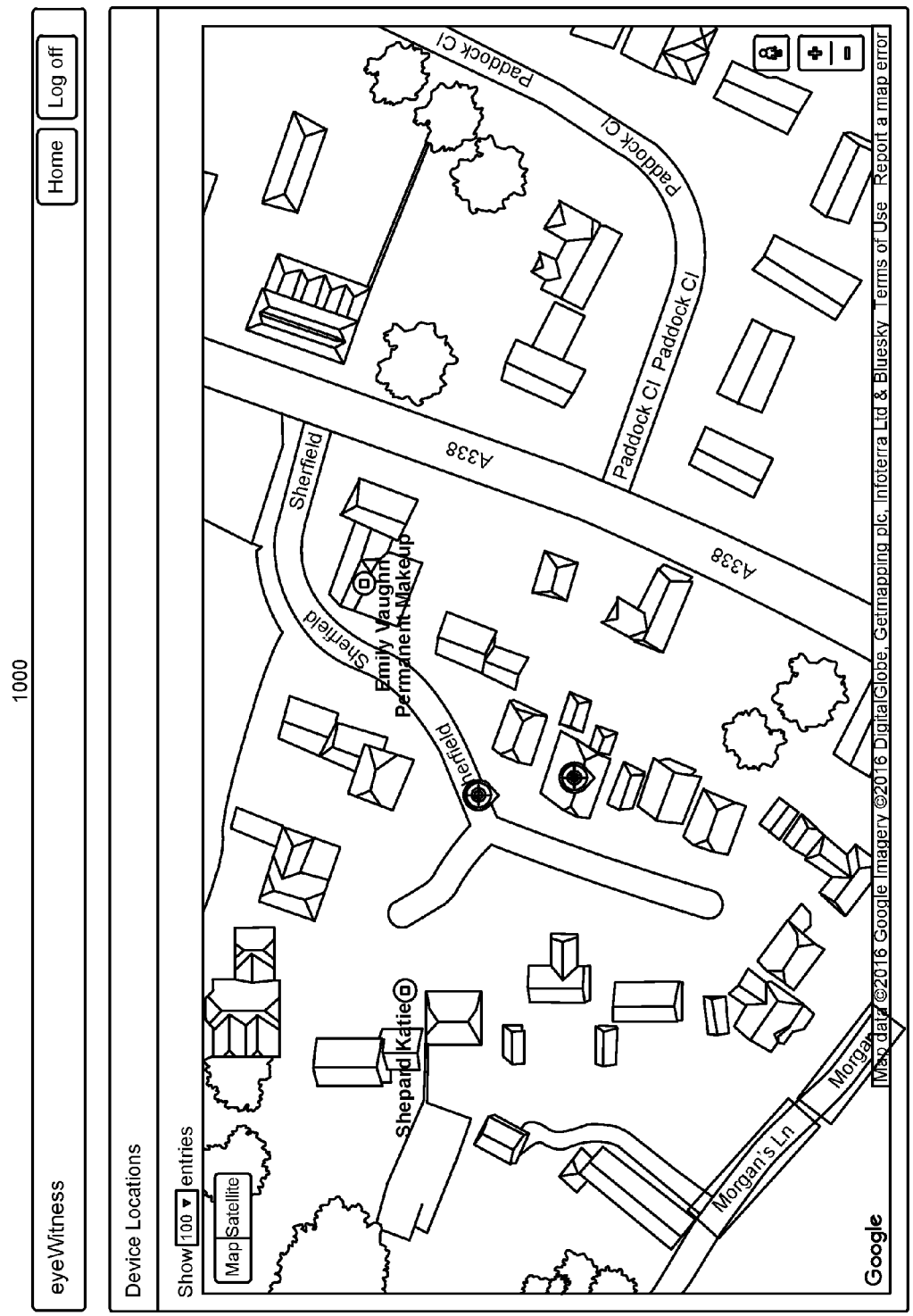

FIGS. 9-11 are client 120 screenshots according to an embodiment of the invention. For example, FIG. 9 shows a map view 900 of locations within the United Kingdom where images were captured which may be displayed on the client 120. The locations may be determined based on the geolocation coordinates detected by the geolocation receiver 225 as described above. FIG. 10 shows a satellite view 1000 of one of the locations which may be displayed on the device 200. In this view 1000, distinguishing features of the location may be seen, for example the cul de sac with four driveways. Furthermore, the satellite view 1000 may provide a direct geolocation reference (e.g., through satellite image data linking the image to a known location on the earth). FIG. 11 shows the image 1100 taken at the location. The cul de sac and four driveways are visible in the image 1100. Metadata 1110 is also shown. The metadata 1110 may be captured and added to the image 1100 as described above and may be used to provide data integrity and verifiability to help the image 1100 meet evidentiary standards in a court proceeding or otherwise verify the provenance and originality of the image 1100. For example, the metadata 1110 may include geolocation data derived from cell tower and WiFi metadata, as discussed above.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments.

In addition, it should be understood that any figures that highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A secure media capture, transfer, and storage method comprising:
   capturing, with a first sensor of a device, media;
   capturing, with a second sensor of the device, data indicating a time, a place, or a combination thereof at which the media is captured;
   obtaining, with a processor of the device, device metadata;
   associating, with the processor, the data, the media, and the device metadata to form a submission;
   encrypting, with the processor, the submission;
   sending, with a communication module of the device, the submission to a public web server via a public network, the public web server comprising a processor and a memory;
   sending, with a vault export module of the public web server, the submission to a private file server via a private network, the private file server comprising a processor and a memory, and the private file server being inaccessible from the public network;
   storing, with a vault service module of the private file server, the submission in a secure database; and
   removing the submission from a memory of the public web server.

2. The method of claim 1, further comprising:
   retrieving, with the vault service module, the submission from the secure database;
   sending, with the vault service module, the retrieved submission to a private web server via the private network, the private web server comprising a processor and a memory, and the private web server being inaccessible from the public network; and
   providing, with a dashboard service module of the private web server, the retrieved submission to a client.

3. The method of claim 1, wherein capturing the media comprises recording a still image, a video, an audio recording, or a combination thereof.

4. The method of claim 1, wherein capturing the data comprises detecting a base station, detecting a cellular tower, detecting a wireless network, detecting another device, detecting a geolocation location, detecting accelerometer data, detecting gyroscopic data, or a combination thereof.

5. The method of claim 1, wherein obtaining the device metadata comprises determining a device state, retrieving device data from a device memory, or a combination thereof.

6. The method of claim 1, further comprising:
   receiving, with the processor, annotation data; and
   adding, with the processor, the annotation data to the submission.

7. The method of claim 6, wherein the annotation data is received via a device user input.

8. The method of claim 1, wherein the removing is performed after the storing.

9. A secure media capture, transfer, and storage system comprising:
   a device comprising a first sensor, a second sensor, and a processor configured to:
      capture media via a first sensor;
      capture data indicating a time, a place, or a combination thereof at which the media is captured via a second sensor;
      associate the data, the media, and the device metadata to form a submission;
      encrypt the submission; and
      transmit the submission via a public network;
   a public web server comprising a processor and a memory configured to:
      receive the submission from the device via the public network; and
      transmit the submission via a private network; and
      remove the submission from the memory of the public web server; and
   a private file server comprising a memory and a processor configured to:
      receive the submission from the public web server via the private network; and
      store the submission in a secure database,
   wherein the private file server is inaccessible from the public network.

10. The system of claim 9, wherein the public web server comprises a vault export module configured to send the submission to the private file server via the private network.

11. The system of claim 9, wherein the private file server comprises:
    a secure database; and
    a vault service module configured to store the submission in the secure database.

12. The system of claim 9, further comprising a private web server, wherein:
    the private file server is further configured to:
       retrieve the submission from the secure database; and
       send the retrieved submission to a private web server via the private network;

the private web server is configured to provide the retrieved submission to a client; and the private web server is inaccessible from the public network.

13. The system of claim 12, wherein the private web server comprises a dashboard service module configured to provide the retrieved submission to a client.

14. The system of claim 9, wherein the device comprises:
a secure memory;
a first sensor configured to capture the media;
a second sensor configured to the capture data;
a processor configured to:
  obtain the device metadata;
  associate the data, the media, and the device metadata to form the submission;
  encrypt the submission; and
  store the submission in the secure memory; and
a communication module configured to send the submission to the public web server via the public network.

15. The system of claim 14, wherein the first sensor comprises a camera, a microphone, or a combination thereof.

16. The system of claim 14, wherein the second sensor comprises a network receiver, a geolocation receiver, an accelerometer, a gyroscope, or a combination thereof.

17. The system of claim 14, wherein obtaining the device metadata comprises determining a device state, retrieving device data from a device memory, or a combination thereof.

18. The system of claim 14, wherein:
the device further comprises a user input configured to send annotation data to the processor; and
the processor is further configured to add the annotation data to the submission.

19. The system of claim 9, wherein the media comprises a still image, a video, an audio recording, or a combination thereof.

20. The system of claim 9, wherein the data comprises detected network data, detected other device data, a geolocation location, accelerometer data, gyroscopic data, or a combination thereof.

21. The system of claim 9, wherein the public web server is configured to remove the submission after the private file server stores the submission.

22. A secure media transfer and storage method comprising:
receiving, with a public web server comprising a processor and a memory, an encrypted submission via a public network, the submission comprising media captured with a first sensor of a device, data captured with a second sensor of the device, and device metadata, the data indicating a time, a place, or a combination thereof at which the media is captured;
sending, with a vault export module of the public web server, the submission to a private file server via a private network, the private file server comprising a processor and a memory, and the private file server being inaccessible from the public network;
storing, with a vault service module of the private file server, the submission in a secure database; and
removing the submission from a memory of the public web server.

23. The method of claim 22, further comprising:
retrieving, with the vault service module, the submission from the secure database;
sending, with the vault service module, the retrieved submission to a private web server via the private network, the private web server comprising a processor and a memory, and the private web server being inaccessible from the public network; and
providing, with a dashboard service module of the private web server, the retrieved submission to a client.

24. The method of claim 22, wherein the submission further comprises annotation data.

25. The method of claim 22, wherein the removing is performed after the storing.

26. A secure media transfer and storage system comprising:
a public web server comprising a memory and a processor configured to:
  receive an encrypted submission via a public network, the submission comprising media captured with a first sensor of a device, data captured with a second sensor of the device, and device metadata, the data indicating a time, a place, or a combination thereof at which the media is captured;
  transmit the submission via a private network; and
  remove the submission from the memory of the public web server; and
a private file server comprising a memory and a processor configured to:
  receive the submission from the public web server via the private network; and
  store the submission in a secure database,
wherein the private file server is inaccessible from the public network.

27. The system of claim 26, wherein the public web server comprises a vault export module configured to send the submission to the private file server via the private network.

28. The system of claim 26, wherein the private file server comprises:
a secure database; and
a vault service module configured to store the submission in the secure database.

29. The system of claim 26, further comprising a private web server comprising a memory and a processor, wherein:
the private file server is further configured to:
  retrieve the submission from the secure database; and
  send the retrieved submission to a private web server via the private network;
the private web server is configured to provide the retrieved submission to a client; and
the private web server is inaccessible from the public network.

30. The system of claim 29, wherein the private web server comprises a dashboard service module configured to provide the retrieved submission to a client.

31. The system of claim 29, wherein the media comprises a still image, a video, an audio recording, or a combination thereof.

32. The system of claim 29, wherein the data comprises detected network data, detected other device data, a geolocation location, accelerometer data, gyroscopic data, or a combination thereof.

33. The system of claim 26, wherein the public web server is configured to remove the submission after the private file server stores the submission.

* * * * *